United States Patent
Liu et al.

(10) Patent No.: US 10,815,969 B2
(45) Date of Patent: Oct. 27, 2020

(54) METHODS AND APPARATUS FOR REFURBISHING WIND TURBINE FOUNDATIONS

(71) Applicant: General Electric Company, Schenectady, NY (US)

(72) Inventors: Shijiang Liu, Shanghai (CN); Lan Xu, Shanghai (CN); Jay F. Leonard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/348,730

(22) PCT Filed: Nov. 10, 2016

(86) PCT No.: PCT/CN2016/105300
§ 371 (c)(1),
(2) Date: May 9, 2019

(87) PCT Pub. No.: WO2018/086022
PCT Pub. Date: May 17, 2018

(65) Prior Publication Data
US 2019/0293053 A1   Sep. 26, 2019

(51) Int. Cl.
*F03D 13/20* (2016.01)
*E02D 27/42* (2006.01)

(52) U.S. Cl.
CPC ............ *F03D 13/22* (2016.05); *E02D 27/42* (2013.01); *E02D 27/425* (2013.01); *F05B 2230/80* (2013.01); *Y02E 10/728* (2013.01); *Y02P 70/523* (2015.11)

(58) Field of Classification Search
CPC ....... E02D 27/42; E02D 27/425; E04H 12/34; E04H 12/2292; F03D 13/22; F05B 2230/80; E04G 23/0229; E04G 23/06
See application file for complete search history.

(56) References Cited

U.S. PATENT DOCUMENTS

| | | | |
|---|---|---|---|
| 8,613,569 B2 | 12/2013 | Belinsky et al. | |
| 9,016,005 B2 | 4/2015 | Garcia Maestre et al. | |
| 2009/0178353 A1* | 7/2009 | Reyneveld | E02D 27/42 52/297 |
| 2011/0131899 A1 | 6/2011 | Voss et al. | |
| 2011/0138706 A1 | 6/2011 | Voss et al. | |
| 2012/0131789 A1 | 5/2012 | Zhu | |

(Continued)

FOREIGN PATENT DOCUMENTS

| | | |
|---|---|---|
| CN | 201377090 Y | 1/2010 |
| CN | 101063509 B | 6/2011 |

(Continued)

OTHER PUBLICATIONS

PCT ISR PCT/CN2016/105300 dated Aug. 9, 2017.

*Primary Examiner* — Gisele D Ford
(74) *Attorney, Agent, or Firm* — Dority & Manning, P.A.

(57) ABSTRACT

A method for refurbishing a wind turbine includes positioning a new tower support mount on an existing foundation of the wind turbine, the existing foundation including an existing foundation pad and an existing tower support mount at least partially embedded in the existing foundation pad. The method further includes inserting a plurality of anchors through the new tower support mount.

20 Claims, 10 Drawing Sheets

(56) References Cited

U.S. PATENT DOCUMENTS

| | | | |
|---|---|---|---|
| 2012/0137620 A1 | 6/2012 | Gevers et al. | |
| 2012/0291394 A1 | 11/2012 | Tooman | |
| 2014/0318033 A1* | 10/2014 | Coordes | E02D 27/42 |
| | | | 52/40 |
| 2016/0230365 A1* | 8/2016 | Shi | E02D 27/42 |
| 2016/0251818 A1* | 9/2016 | Thomsen | E02D 27/425 |
| | | | 52/297 |
| 2018/0202123 A1* | 7/2018 | Spronken | E02D 27/42 |
| 2018/0355851 A1* | 12/2018 | Brohm | E02D 27/425 |
| 2019/0226174 A1* | 7/2019 | Schuldt | E02D 27/425 |

FOREIGN PATENT DOCUMENTS

| | | |
|---|---|---|
| CN | 102095052 A | 6/2011 |
| CN | 102277877 A | 12/2011 |
| CN | 102374138 A | 3/2012 |
| CN | 102518570 A | 6/2012 |
| CN | 102704505 A | 10/2012 |
| CN | 102996370 A | 3/2013 |
| CN | 103046575 A | 4/2013 |
| CN | 203403432 U | 1/2014 |
| CN | 103899495 A | 7/2014 |
| CN | 203925895 U | 11/2014 |
| CN | 105133677 A | 12/2015 |
| CN | 104790424 B | 7/2016 |
| EP | 2518240 A1 | 10/2012 |
| EP | 2751343 B1 | 3/2016 |
| KR | 20160060431 A | 5/2015 |
| WO | WO2010/059489 A1 | 5/2010 |
| WO | WO2012/035206 A1 | 3/2012 |

\* cited by examiner

METHODS AND APPARATUS FOR REFURBISHING WIND TURBINE FOUNDATIONS

FIELD

The present disclosure relates generally to wind turbines, and more particularly to methods for refurbishing wind turbines and refurbished wind turbines.

BACKGROUND

Wind power is considered one of the cleanest, most environmentally friendly energy sources presently available, and wind turbines have gained increased attention in this regard. A modern wind turbine typically includes a tower, generator, gearbox, machine head, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine technology is rapidly progressing. Accordingly, as the technology utilized in existing wind turbines becomes outdated and/or existing wind turbines approach their designed lives, it may be desirable to refurbish such existing wind turbines and associated wind farms. Such refurbishment can provide various advantages, including the implementation of newer, more efficient technology and components on existing base components. For example, in many cases, the machine head and, optionally, the yaw drive, can be replaced. A new, more technologically advanced machine head and associated tower and other various components can be provided on to an existing foundation. Accordingly, additional life and more efficient power generation can be provided with reduced capital expenses.

One concern, however, is that the existing foundation may not be capable of supporting such new components. For example, the load capability of an existing foundation may be limited. Further, complete removal of an existing foundation may not be desirable, because of the time and cost associated with such removal and because such removal would additionally require removal of additional wind turbine apparatus such as cabling infrastructure, pad mounted transformers, etc.

Accordingly, improved wind turbines, and in particular improved apparatus and methods for refurbishing wind turbine foundations, are desired in the art.

BRIEF DESCRIPTION

Aspects and advantages of the invention will be set forth in part in the following description, or may be obvious from the description, or may be learned through practice of the invention.

In accordance with one embodiment, a method for refurbishing a wind turbine is provided. The method includes positioning a new tower support mount on an existing foundation of the wind turbine, the existing foundation including an existing foundation pad and an existing tower support mount at least partially embedded in the existing foundation pad. The method further includes inserting a plurality of anchors through the new tower support mount. The method further includes connecting a tower section of a tower of the wind turbine to the new tower support mount. A maximum diameter of the new tower support mount is greater than a maximum diameter of the existing tower support mount.

In accordance with another embodiment, a method for refurbishing a wind turbine is provided. The method includes positioning a new tower support mount on an existing foundation of the wind turbine, the existing foundation including an existing foundation pad and an existing tower support mount at least partially embedded in the existing foundation pad. The method further includes inserting a plurality of anchors through the new tower support mount. The method further includes providing a new foundation pad on the existing foundation, wherein at least a portion of each of the plurality of anchors is embedded in the new foundation pad. The method further includes connecting a tower section of a tower of the wind turbine to the new tower support mount.

In accordance with another embodiment, a refurbished wind turbine is provided. The refurbished wind turbine includes an existing foundation, the existing foundation including an existing foundation pad and an existing tower support mount at least partially embedded in the existing foundation pad. The refurbished wind turbine further includes a new tower support mount positioned on the existing foundation, and a plurality of anchors extending through the new tower support mount.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
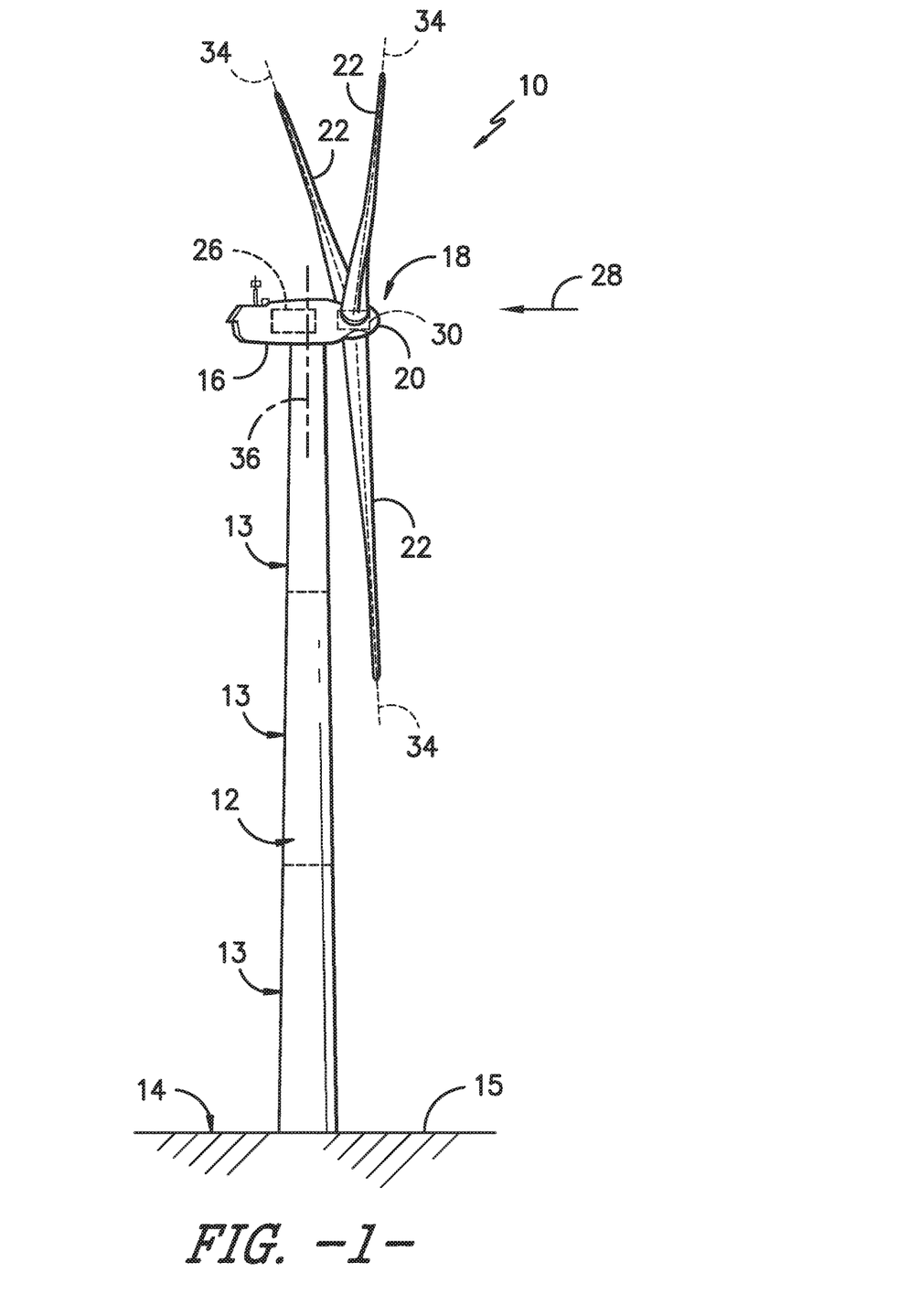
FIG. 1 is a perspective view of a wind turbine according to embodiments of the present disclosure.

FIG. 1 illustrates perspective view of one embodiment of a wind turbine 10. As shown, the wind turbine 10 includes a tower 12 extending from a support surface 14, a machine head 16 mounted on the tower 12, and a rotor 18 coupled to the machine head 16. The support surface 14 may include the ground and a foundation, as discussed herein. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the machine head 16 to permit electrical energy to be produced.

As shown, the wind turbine 10 may also include a turbine control system or a turbine controller 26 centralized within the machine head 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the machine head 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the machine head 16 may be rotated about the yaw axis 36.

It should be appreciated that the turbine controller 26 and/or the pitch controller 30 may generally comprise a computer or any other suitable processing unit. Thus, in several embodiments, the turbine controller 26 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch and yaw controllers to perform various computer-implemented functions. In addition, the turbine controller 26 and/or pitch and yaw controllers may also include various input/output channels for receiving inputs from sensors and/or other measurement devices and for sending control signals to various components of the wind turbine 10.

Figure 2:
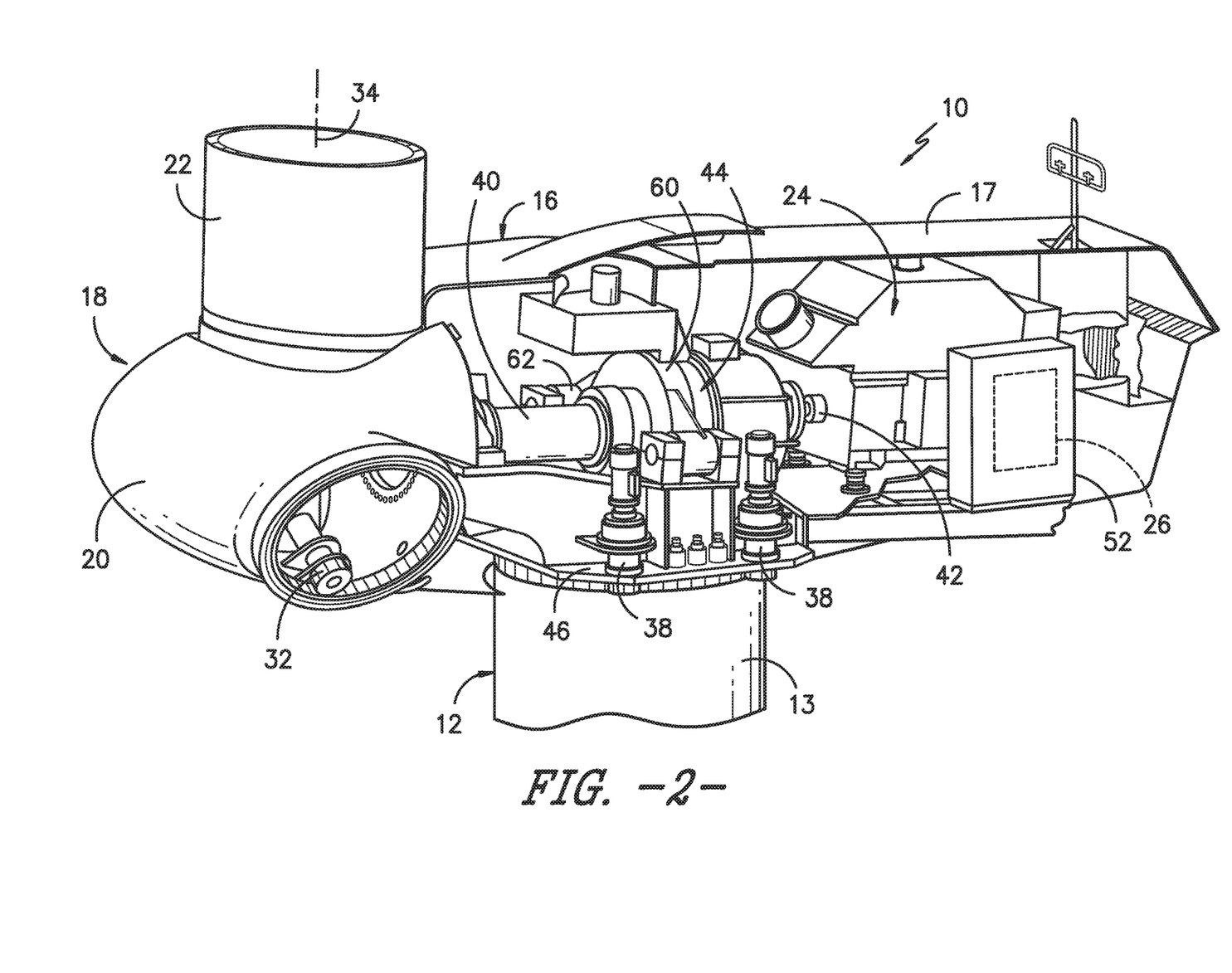
FIG. 2 illustrates a perspective, internal view of a machine head of a wind turbine according to embodiments of the present disclosure.

Referring now to FIG. 2, a simplified, internal view of one embodiment of the machine head 16 of the wind turbine 10 is illustrated. As shown, a generator 24 may be disposed within the machine head 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40 (often referred to as a "direct-drive wind turbine").

It should be appreciated that the main shaft 40 may generally be supported within the machine head 16 by a base frame or bedplate 46 positioned atop the wind turbine tower 12. For example, the main shaft 40 may be supported by the base frame 46 via one or more pillow blocks mounted to the base frame 46.

Additionally, as indicated above, the turbine controller 26 may also be located within the machine head 16 of the wind turbine 10. For example, as shown in the illustrated embodiment, the turbine controller 26 is disposed within a control cabinet 52 mounted to a portion of the machine head 16.

However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the machine head 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Referring still to FIG. 2, gearbox 44 may be coupled to main shaft 40, and may be mounted to the base frame 46. As shown, gearbox 44 may include an outer casing 60 which may surround and generally enclose the internal gearbox components, such as the various gears, etc. thereof. Further, one or more torque arms 62 may extend from the outer casing 60. Typically, two torque arms 62 extend from the outer casing 60 on generally opposing sides of the casing 60. A torque arm 62 may generally facilitate reaction and transmission of loads to which the shaft 40, etc., are subjected by transmitting these loads from the gearbox 44 to, for example, the base frame 46.

As illustrated, a nacelle 17 may surround and enclose the various components within the machine head 16. In general, the base frame 46 and nacelle 17 may form the outer surface(s) of the machine head 16.

Figure 3:
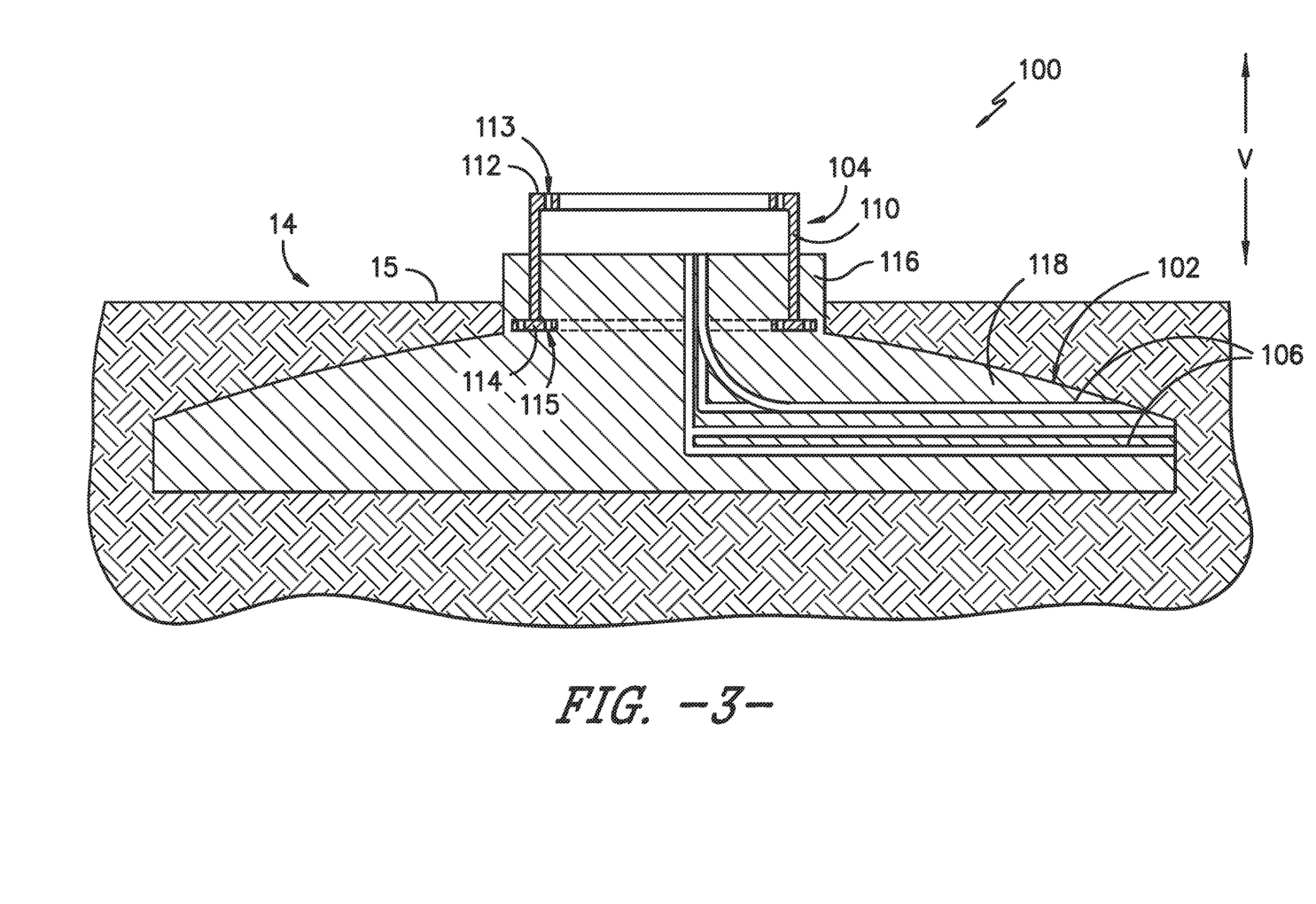
FIG. 3 is a cross-sectional view of an existing wind turbine foundation in accordance with embodiments of the present disclosure.

Referring now to FIG. 3, a support surface 14 for a wind turbine 10 in accordance with the present disclosure is provided. The support surface 14 includes the ground 15 on which the wind turbine 10 is generally supported, and further includes an existing foundation 100 which provides structural support for the wind turbine 10. Existing foundation 100 may be at least partially buried in the ground 15, as shown. The existing foundation 100 may include an existing foundation pad 102 and an existing tower support mount 104 that is at least partially embedded in the existing foundation pad 102. Foundation pad 102 may include a matrix, such as a concrete, and may further include rebar members and/or other suitable structure support apparatus embedded in the matrix. Additionally, passages 106 for various components of the wind turbine 10 such as electrical wiring, etc., may be defined in the existing foundation pad 102.

Existing tower support mount 104 is generally provided to connect the tower 12, such as a lower tower section 13 thereof, to the existing foundation 100. Accordingly, in exemplary embodiments, a portion of the tower support mount 104 may protrude (such as vertically along a vertical axis V (which may be parallel to yaw axis 36) of the foundation 100 and wind turbine 10 generally) from the foundation pad 102. The remainder (or in alternative embodiments, all) of the tower support mount 104 may be embedded in the foundation pad 102.

In exemplary embodiments, the tower support mount 104 and component thereof may be formed from suitable metals, such as steel. Alternatively, other suitable materials may be utilized.

In some embodiments, as illustrated, tower support mount 104 may include a ring body 110, an upper flange 112 extending from the ring body 110, and a lower flange 114 extending from the ring body 110. The upper flange 112 and lower flange 114 may be spaced apart from each other along the vertical axis V. Such embodiments may be conventionally referred to as mounting rings. Upper flange 112 and lower flange 114 may each extend radially (i.e. perpendicularly from the vertical axis V) from the ring body 110. For example, lower flange 114 may in some embodiments as shown be a T-flange, and may thus extend both radially inwardly and radially outwardly from the ring body 110. Alternatively, lower flange 114 may in some embodiments be an L-flange, and may thus extend either only radially inwardly or only radially outwardly from the ring body 110. Upper flange 112 may in some embodiments as shown be an L-flange, and may thus extend either only radially inwardly (as shown) or only radially outwardly from the ring body 110. Alternatively, upper flange 112 may in some embodiments be a T-flange, and may thus extend both radially inwardly and radially outwardly from the ring body 110. The upper flange 112 may include fastener holes 113 defined therein, and fasteners (such as bolts or other suitable mechanical fasteners) may extend therethrough to fasten a tower 12, such as a lower tower section 13 thereof, to the upper flange 112. The lower flange 114 may include anchor holes 115 defined therein, and anchors (such as anchor bolts or other suitable mechanical fasteners) may extend therethrough to further connect the tower support mount 104 to the foundation pad 102.

It should be understood, however, that the present disclosure is not limited to existing tower support mounts 104 as discussed above. For example, in alternative embodiments, an existing tower support mount 104 may be an anchor cage. The anchor cage may include a lower disc which includes a plurality of anchor holes defined therethrough. The anchor cage may further include an upper disc (positioned above the lower disc along the vertical axis V) which includes a plurality of anchor holes defined therethrough. Anchors may extend through the anchor holes of the upper and lower discs to couple the disc together and form the anchor cage. The lower disc may be fully embedded in the existing foundation pad 102, and portions of the anchors may be embedded in the existing foundation pad 102. The upper disc may protrude from the existing foundation pad 102.

Foundation pad 102 may include a central portion 116. Further, in some embodiments, foundation pad 102 may further include an outer footing 118 which extends radially from the central portion 116. The outer footing 118 may further taper outwardly from the central portion 116, as shown.

Referring now to FIGS. 4 through 10, embodiments illustrating refurbished wind turbines 10 (and refurbished foundations 200 thereof) and methods for refurbishing wind turbines 10 are provided. Such refurbished wind turbines 10 and methods in accordance with the present disclosure are particularly advantageous, as they allow for the implementation of newer, more efficient technology and components on existing base components. More specifically, such refurbished wind turbines 10 and methods in accordance with the present disclosure advantageously increase the load capability of existing foundations, and facilitate efficient refurbishment without the time and cost associated with complete removal of an existing foundation. Further, various additional existing wind turbine apparatus such as cabling infrastructure, pad mounted transformers, etc. may be utilized in such refurbished wind turbines 10, and removal of such component is thus not required.

Notably, refurbishment of a wind tower 10 in accordance with the present disclosure may include removal of an existing tower 12, including an existing lower tower section 13 thereof, from the existing foundation 100.

As shown, a refurbished foundation 200 may include the existing foundation 100. In some cases, as illustrated in FIG. 10, a portion of the existing tower support mount 104 and/or foundation pad 102 may be removed to facilitate such refurbishment. For example, a portion of the tower support mount 104 that protrudes from the existing foundation pad 102 such as, for example, an upper flange 112 or upper disc, may be removed. However, complete removal of the existing tower support mount 104 is not required, and removal of the existing foundation pad 102 may not be required. Alternatively, a portion of the foundation pad 102, such as a portion of the central portion 116 (i.e. the portion extending vertically above the outer footing 118, may be removed. A portion of the tower support mount 104 may or may not, in these embodiments, also be required. In alternative embodiments as illustrated in FIGS. 4 through 9, removal of the existing tower support mount 104 and existing foundation pad 102 is not required.

A refurbished foundation 200 may further include a new tower support mount 204, and may in some embodiments further include a new foundation pad 202.

Figure 4:
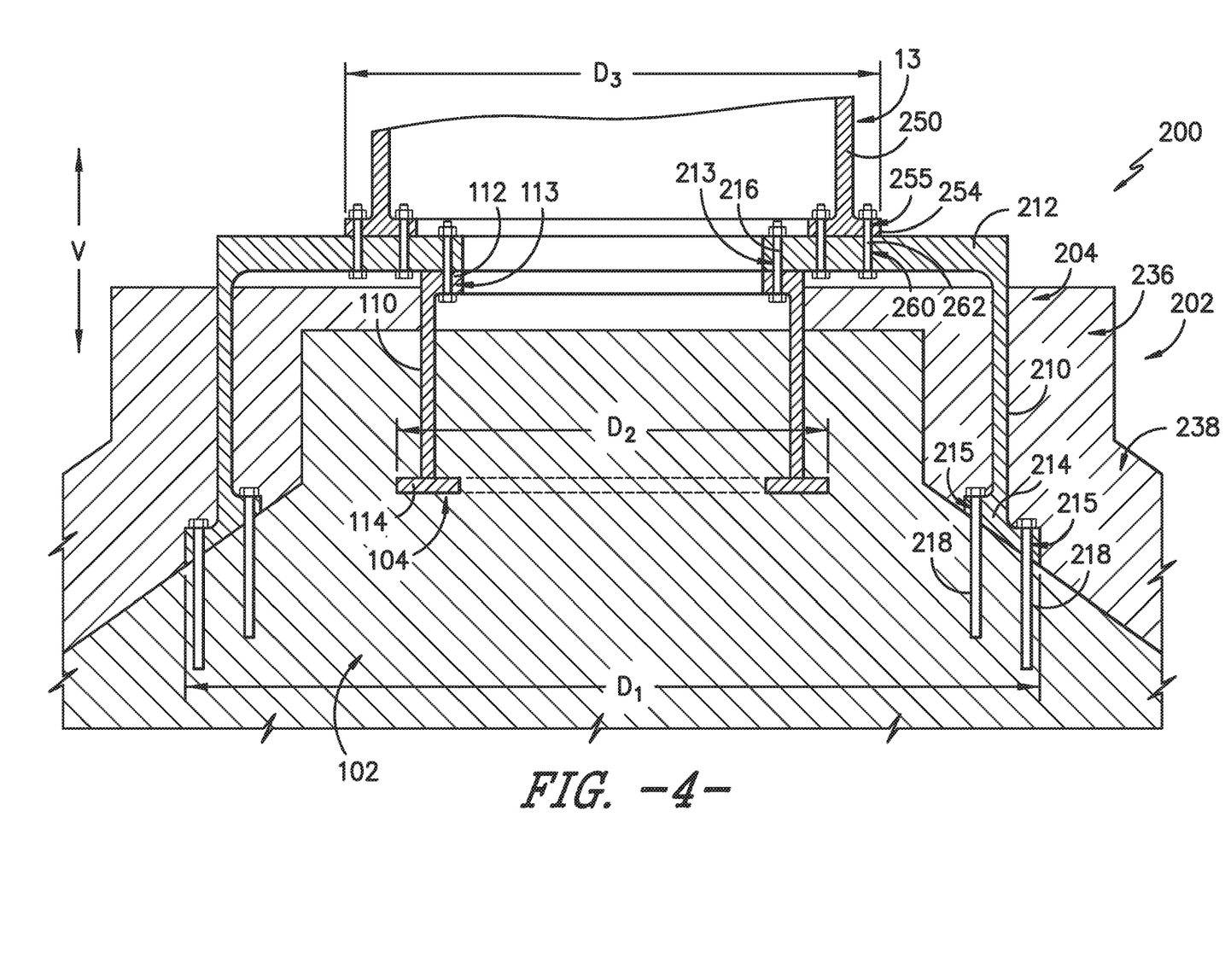
FIG. 4 is a cross-sectional view of a refurbished wind turbine, including a refurbished foundation thereof, in accordance with embodiments of the present disclosure.
Figure 5:
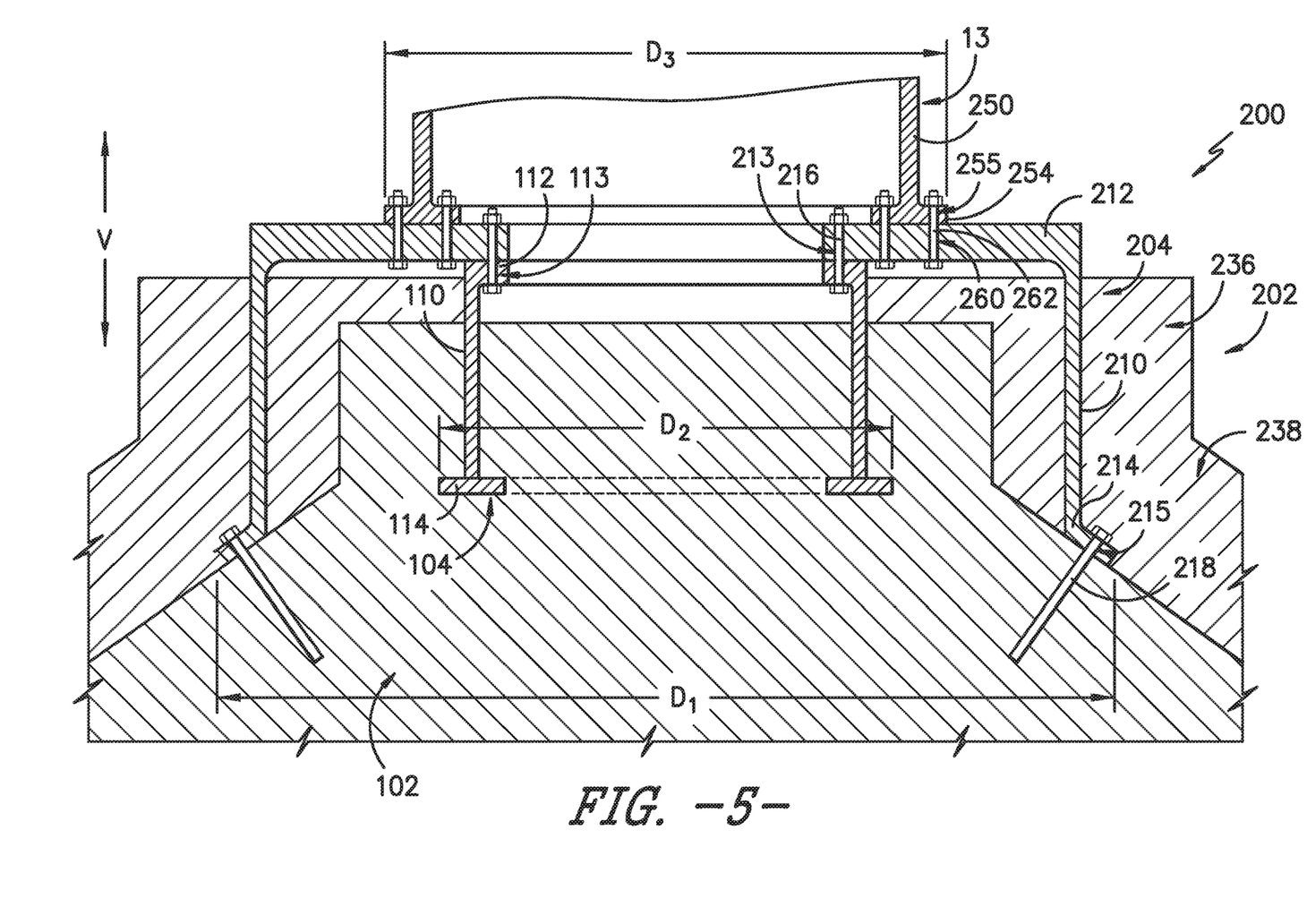
FIG. 5 is a cross-sectional view of a refurbished wind turbine, including a refurbished foundation thereof, in accordance with other embodiments of the present disclosure.
Figure 6:
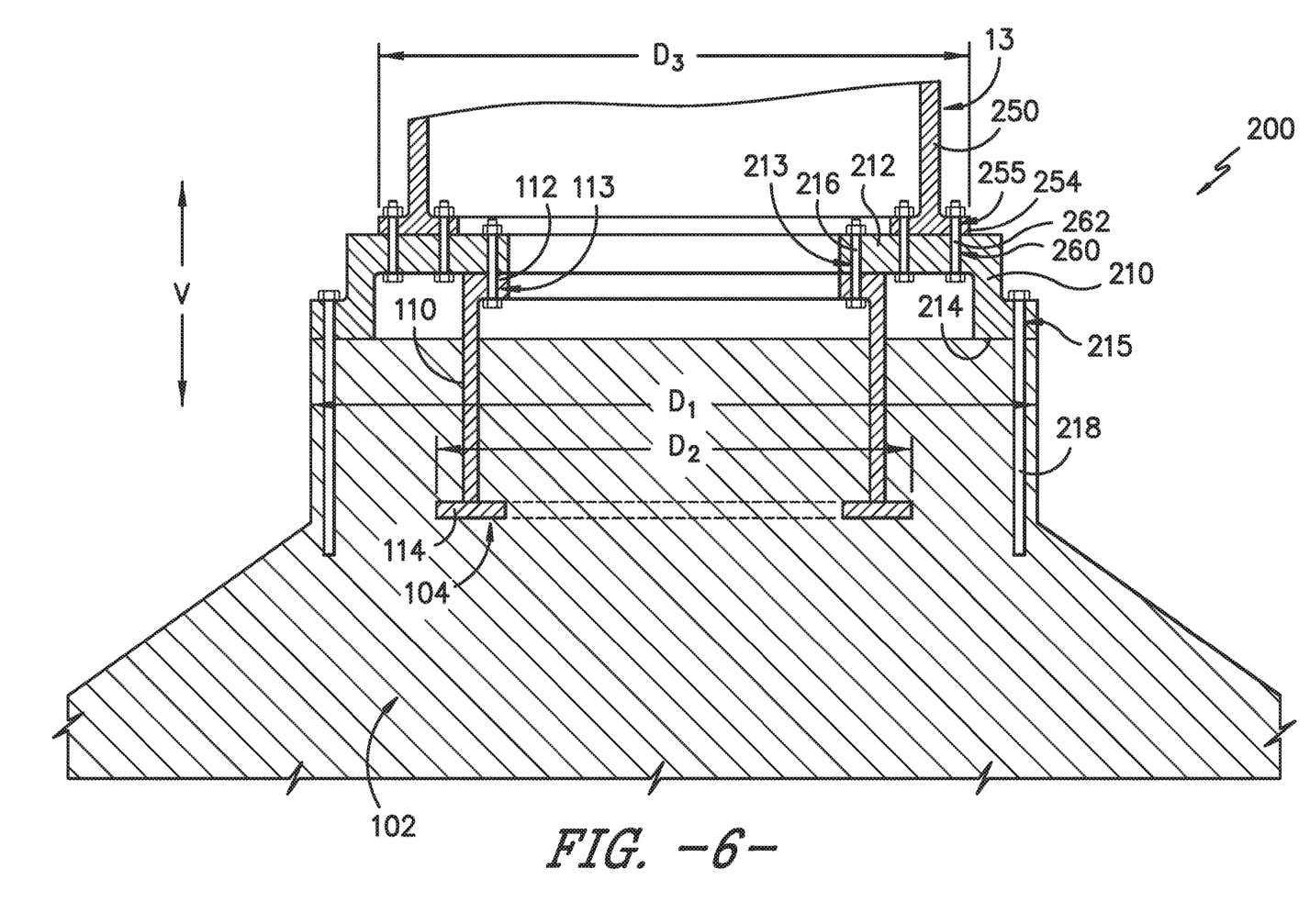
FIG. 6 is a cross-sectional view of a refurbished wind turbine, including a refurbished foundation thereof, in accordance with other embodiments of the present disclosure.
Figure 7:
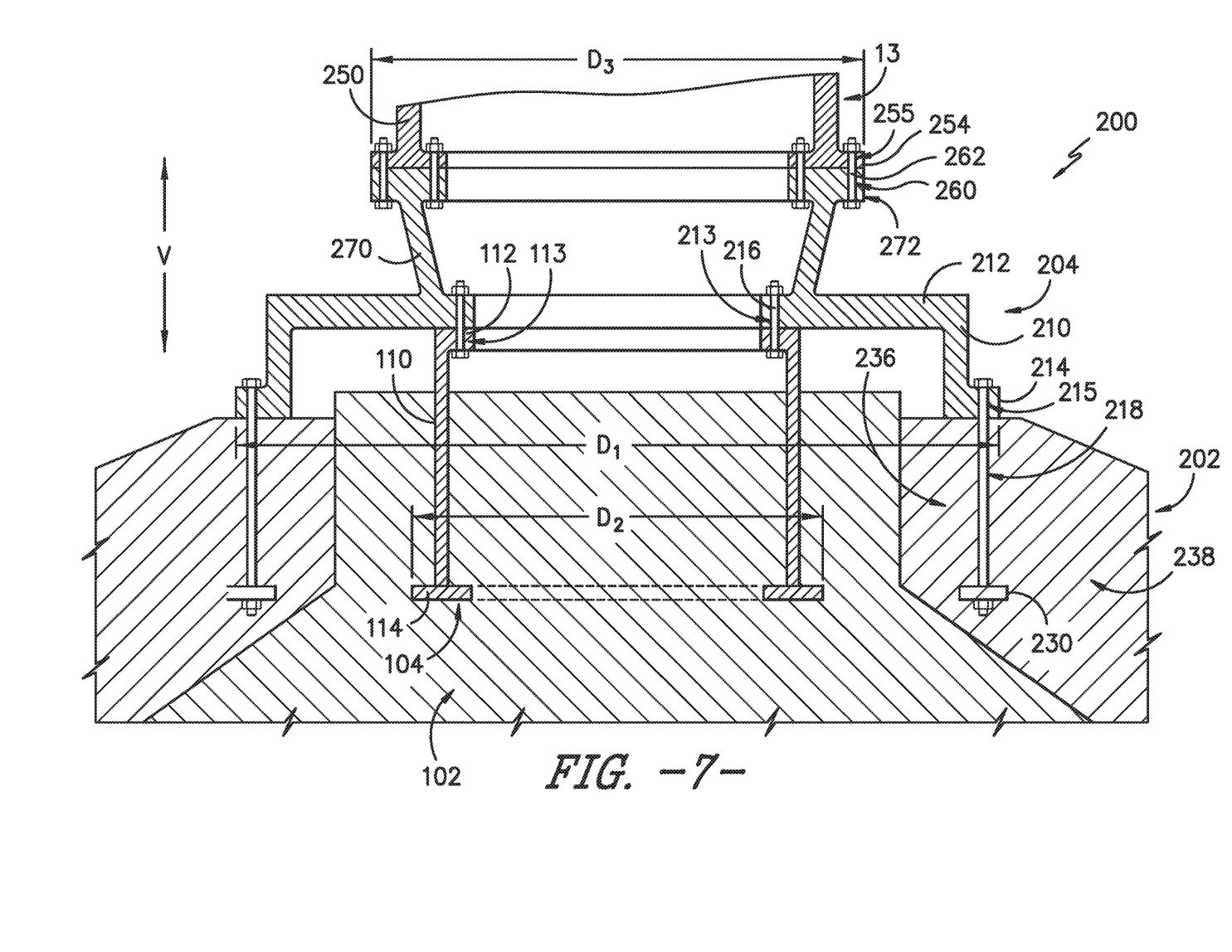
FIG. 7 is a cross-sectional view of a refurbished wind turbine, including a refurbished foundation thereof, in accordance with other embodiments of the present disclosure.
Figure 8:
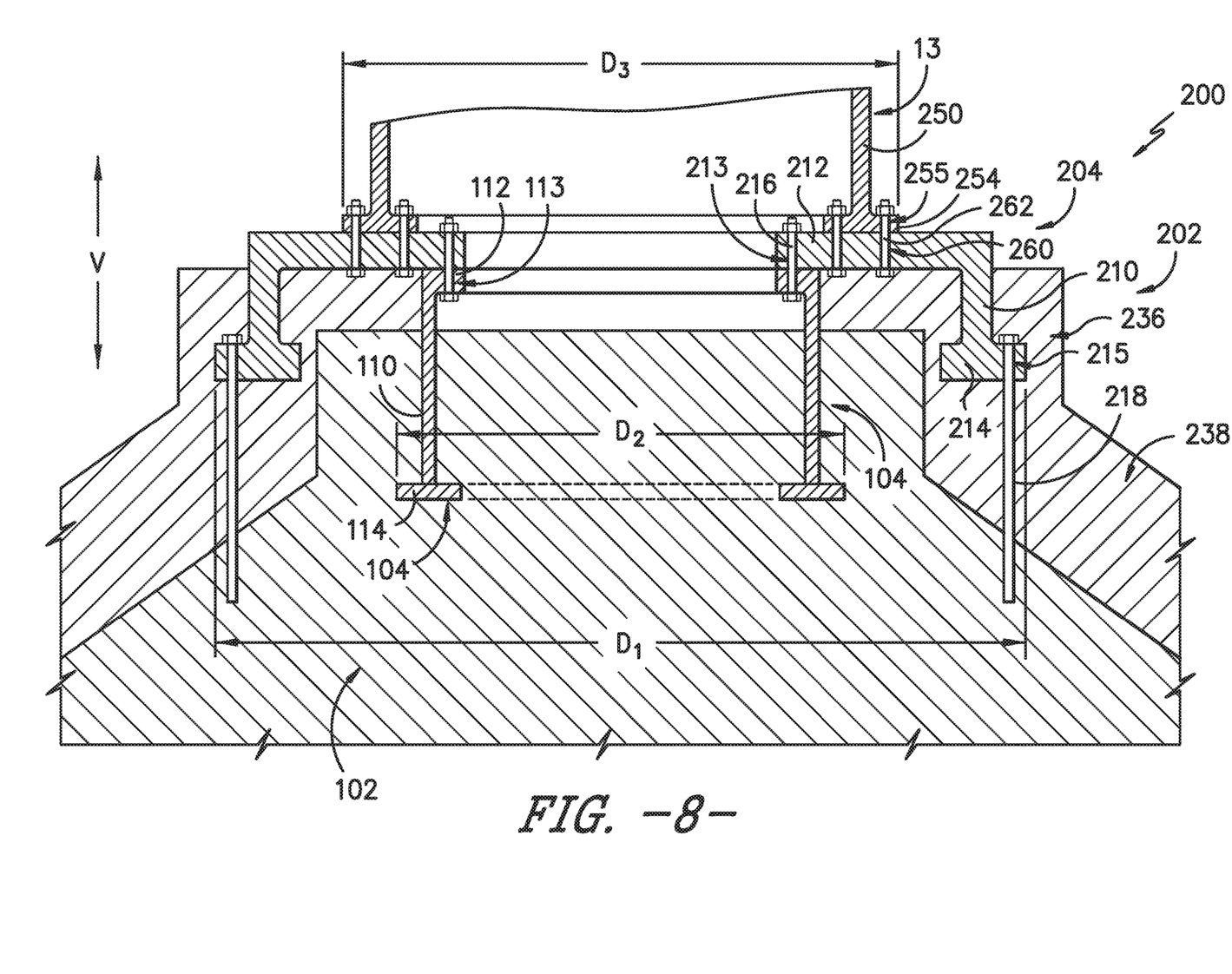
FIG. 8 is a cross-sectional view of a refurbished wind turbine, including a refurbished foundation thereof, in accordance with other embodiments of the present disclosure.

In some embodiments, as illustrated for example, in FIGS. 4, 5, 6, 7, and 8, new tower support mount 204 may include a ring body 210, an upper flange 212 extending from the ring body 210, and a lower flange 214 extending from the ring body 210. The upper flange 212 and lower flange 214 may be spaced apart from each other along the vertical axis V. Upper flange 212 and lower flange 214 may each extend radially (i.e. perpendicularly from the vertical axis V) from the ring body 210. For example, lower flange 214 may in some embodiments as shown in FIGS. 4 and 8 be a T-flange, and may thus extend both radially inwardly and radially outwardly from the ring body 210. Alternatively, as shown in FIGS. 5, 6, and 7, lower flange 214 may in some embodiments be an L-flange, and may thus extend either only radially inwardly (as shown) or only radially outwardly from the ring body 210. Upper flange 212 may in some embodiments as shown in FIGS. 4 through 8 be an L-flange, and may thus extend either only radially inwardly (as shown) or only radially outwardly from the ring body 210. Alternatively, upper flange 212 may in some embodiments be a T-flange, and may thus extend both radially inwardly and radially outwardly from the ring body 210. The upper flange 212 may include fastener holes 213 defined therein, and fasteners 216 (such as bolts or other suitable mechanical fasteners) may extend therethrough to fasten a tower 12, such as a lower tower section 13 thereof (and in particular a new lower tower section 13), to the upper flange 212. The lower flange 214 may include anchor holes 215 defined therein, and anchors 218 (such as anchor bolts or other suitable mechanical fasteners) may extend therethrough to further connect the tower support mount 204 as discussed herein.

In some embodiments, as illustrated in FIGS. 4 and 6 through 8, the anchor holes 215 may extend vertically through the lower flange 214. Alternatively, as illustrated in FIG. 5, the anchor holes 215 may extend at an angle the vertical axis V. For example, the anchor holes 215 as shown may extend normal to the tapered surface of the outer footing 118, as shown.

Figure 9:
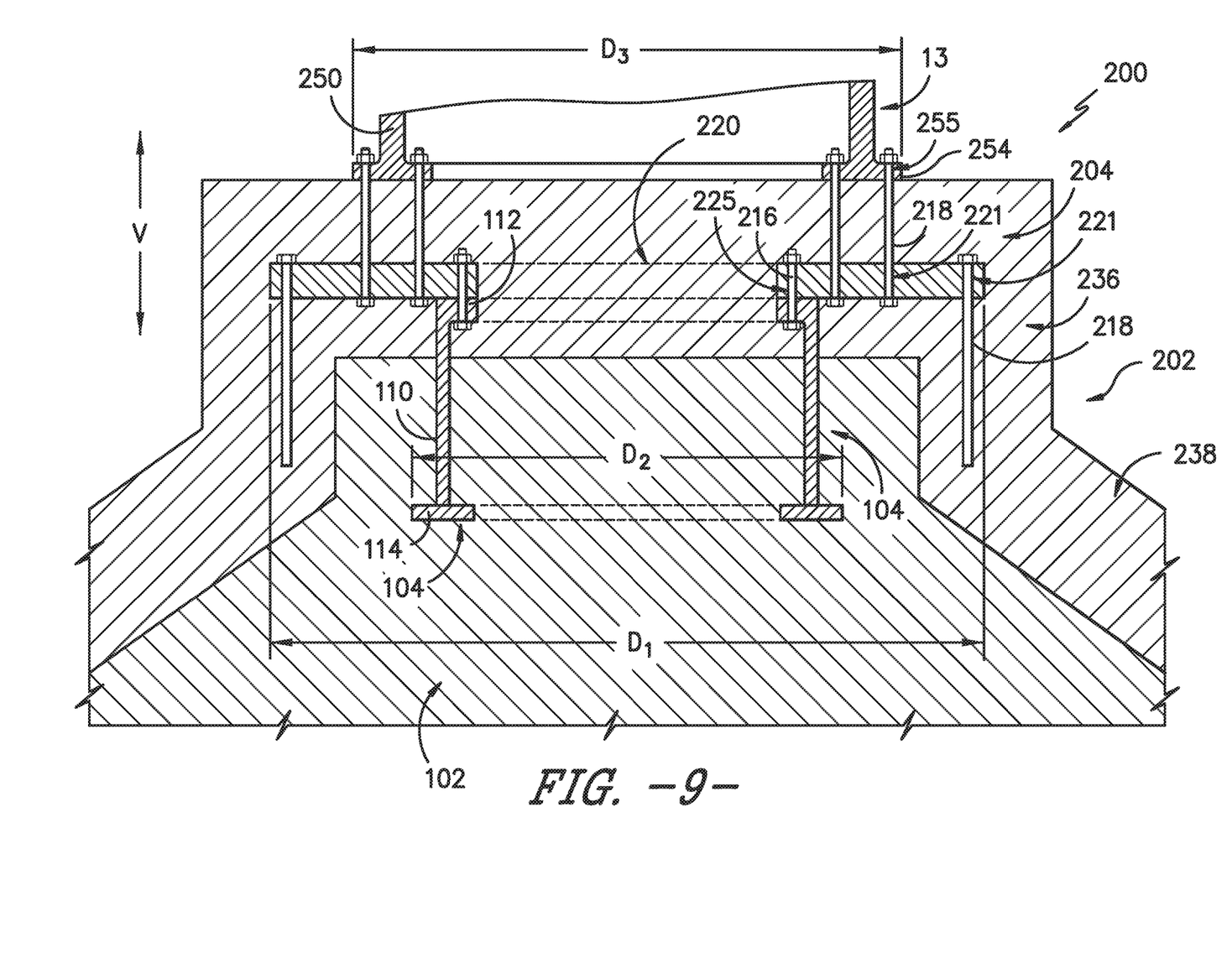
FIG. 9 is a cross-sectional view of a refurbished wind turbine, including a refurbished foundation thereof, in accordance with other embodiments of the present disclosure.
Figure 10:
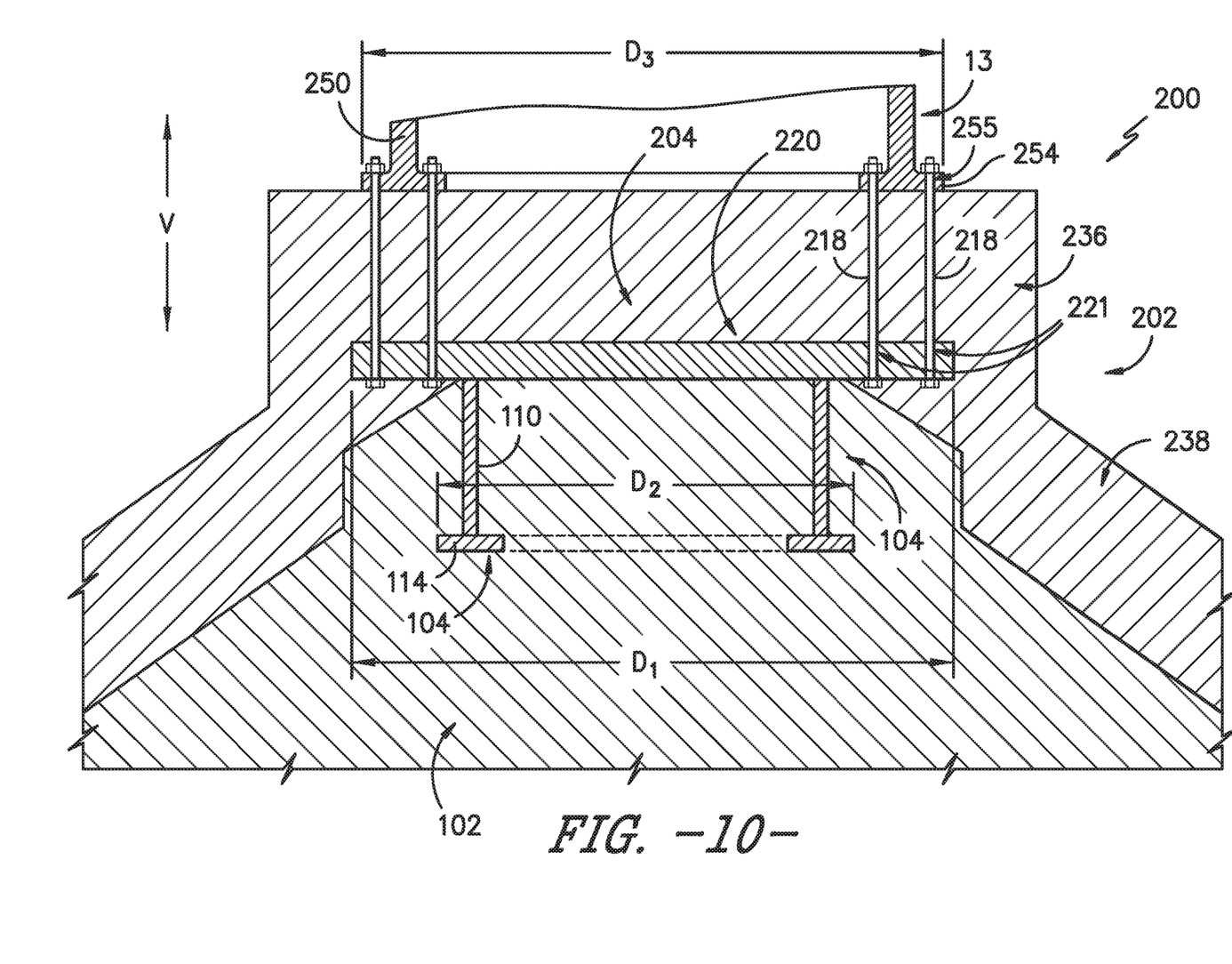
FIG. 10 is a cross-sectional view of a refurbished wind turbine, including a refurbished foundation thereof, in accordance with other embodiments of the present disclosure.

In alternative embodiments, as illustrated for example in FIGS. 9 and 10, a new tower support mount 204 may include a disc 220, such as a lower disc 220. The disc 220 may include a plurality of anchor holes 221 defined therethrough. The new tower support mount 204 may, in some embodiments, further include an upper disc (positioned above the lower disc along the vertical axis V) which includes a plurality of anchor holes defined therethrough. Anchors 218 may extend through the anchor holes 221 of the discs 220 to couple the discs 220 together and form the new tower support mount 204. Alternatively, however, no upper disc may be utilized, and the anchors 218 may extend through anchor holes 221 and holes in flanges of the tower 12 (i.e. a tower section 13 thereof) to couple these components together.

The new tower support mount 204 may, as shown, be positioned on (such as in contact with) the existing foundation 100, such as on the existing foundation pad 102 and/or existing tower support mount 104. For example, in some embodiments, as illustrated in FIGS. 4, 5 and 6, the new tower support mount 204 may be positioned on the existing tower support mount 104 and the existing foundation pad 102. For example, the upper flange 212 may be positioned on existing tower support mount 104. The lower flange 214 may be positioned on the existing foundation pad 102. In some embodiments as shown in FIGS. 4 and 5, the upper flange 212 may be positioned on the upper flange 112 and the lower flange 214 may be positioned on the outer footing 118. In other embodiments as shown in FIG. 6, the upper flange 212 may be positioned on the upper flange 112 and the lower flange 214 may be positioned on the central portion 116. Alternatively, in some embodiments as shown in FIGS. 7 through 9, the new tower support mount 204 may be positioned on only the existing tower support mount 104. For example, in some embodiments as shown in FIGS. 7 and 8, the upper flange 212 may be positioned on the new tower support mount 204, such as the upper flange 112 thereof. In other embodiments as shown in FIG. 9, the lower disc 220 may be positioned on the new tower support mount 204, such as the upper flange 112 thereof. Alternatively, in some embodiments as shown in FIG. 10, the new tower support mount 204 may be positioned on only the existing foundation pad 102. For example, in some embodiments as shown, lower disc 220 may be positioned on the central portion 116.

A plurality of anchors 218 may be inserted through the new tower support 204. These anchors 218 may generally be utilized (in conjunction with other components of the new foundation 200) to secure the new tower support 204 in place. For example, in some embodiments as shown in FIGS. 6 through 8, anchors 218 may be inserted through and thus extend through the anchor holes 215 defined in the lower flange 214. In other embodiments, as shown in FIGS. 9 and 10, anchors 218 may be inserted through and thus extend through the anchor holes 221 defined in lower disc 220. In some embodiments, anchors 218 may further be inserted through and thus extend through the anchor holes defined in an upper disc. Additionally or alternatively, anchors 218 may further be inserted through and thus extend through holes defined in flanges of the tower 12, such as a tower section 13 thereof). In some embodiments, as shown in FIGS. 4, 5, 6 and 8, the anchors 215 may further be inserted through the existing foundation pad 102, such as the central portion 116 thereof (FIG. 6) or the outer footing 118 thereof (FIGS. 4, 5 and 8). Additionally or alternatively, as illustrated in FIGS. 7 and 8 through 10, the anchors 215 may be embedded in the new foundation pad 102. In some embodiments, as shown in FIG. 8, anchors 215 may both extend through the existing foundation pad 102 and be embedded in the new foundation pad 102. Alternatively, as illustrated in FIGS. 7 and 9 through 10, anchors 218 may only be embedded in the new foundation pad 102. Further, in some embodiments as shown in FIG. 7, an auxiliary anchor ring 230 may be provided which includes anchor holes 232 extending therethrough, and the anchors 215 may further extend through these holes 232. The auxiliary anchor ring 230 may be embedded in the new foundation pad 102, as shown.

Fasteners 216 may additionally be provided to connect the new tower support mount 204 (such as the upper flange 212 or lower disc 220) to the old tower support mount 104. For example, the fasteners 216 may be inserted through fastener holes 113, 213 defined in the respective upper flanges to connect these components, as shown for example in FIGS. 4 through 8. Alternatively, lower disc 220 may additional include fastener holes 225 defined therethrough, and fasteners 216 may be inserted through fastener holes 113, 225 defined in the flange 212 and lower disc 220 to connect these components, as shown in FIGS. 9 and 10. In alternative embodiments, no connection of the new tower support mount 204 to the old tower support mount 104 may be required.

In some embodiments, as illustrated in FIGS. 4, 5 and 7 through 10, a new foundation pad 202 may be provided on the existing foundation pad 102. Foundation pad 202 may include a matrix, such as a concrete, and may further include rebar members and/or other suitable structure support apparatus embedded in the matrix. Foundation pad 202 may, when formed, include a central portion 236. Further, in some embodiments, foundation pad 202 may further include an outer footing 238 which extends radially from the central portion 236. The outer footing 238 may further taper outwardly from the central portion 236, as shown. The foundation pad 202 may, for example, be provided after positioning of the new tower support mount 204 and inserting of the anchors 218. Once the new foundation pad 202 is provided, at least a portion of each of the plurality of anchors 218 may be embedded in the new foundation pad 202. Further, in some embodiments, as shown in FIGS. 8 through 10, at least a portion of the new tower support mount 204 may be embedded in the new foundation pad 202. Further, in exemplary embodiments, the new tower support mount 204, such as a portion thereof, may protrude from the new foundation pad 202. For example, the lower flange 214 and a portion of the body 210 may be embedded in the new foundation pad 202, while the upper flange 212 protrudes therefrom, as shown in FIG. 8. Alternatively, the lower disc 220 may be embedded in the new foundation pad 202, as shown in FIGS. 9 and 10. The optional upper disc may also be embedded in the new foundation pad 202. In other embodiments, as shown in FIG. 7, the new tower support mount 204 need not be embedded in the foundation pad 202 and rather may completely protrude therefrom.

A new wind turbine tower 12, such as a new tower section 13 thereof, may be connected to the refurbished foundation 200, such as to the new tower support mount 204. For example, the new tower section 13 may include a lower flange 254 extending from a body 250 of the tower section 13. Lower flange 254 may extend radially (i.e. perpendicularly from the vertical axis V) from the body 250. For example, lower flange 254 may in some embodiments as shown be a T-flange, and may thus extend both radially inwardly and radially outwardly from the ring body 250. Alternatively, lower flange 254 may in some embodiments be an L-flange, and may thus extend either only radially inwardly or only radially outwardly from the body 250. A plurality of mounting holes 255 may be defined through the lower flange 254.

The new tower support mount 204 may further include a plurality of mounting holes 260 defined therethrough. Mounting fasteners 262 (such as bolts or other suitable mechanical fasteners) may extend through a mounting hole and a mating mounting hole 255 to connect a new tower section 13 to a new tower support mount 204 and thus the new foundation 200. In some embodiments, as shown in FIGS. 4, 5, 6, and 8, the mounting holes 260 may be defined in the upper flange 212. Alternatively, as shown in FIG. 7, the new tower support mount 204 may further include an adaptor body 270 and an adaptor flange 272. The adaptor body 270 may extend from the new tower support mount 204 (such as the upper flange 212 thereof), such as at an angle to the vertical axis. The adaptor flange 272 may extend, i.e. radially, from the adaptor body 270. Adaptor flange 272 may be a T-flange as shown or alternatively an L-flange. The mounting holes 260 in these embodiments may extend through the adaptor flange 272. In alternative embodiments, no mounting holes may be provided. For example, as shown in FIGS. 9 and 10, anchors 218 may be utilized to connect a new tower section 13 to a new tower support mount 204. The anchors 218 may thus extend through mating mounting holes 255, as shown.

As illustrated, in exemplary embodiments, a maximum diameter D1 of the new tower support mount 204 may be greater than a maximum diameter D2 of the existing tower support mount 104. Further, in exemplary embodiments, a maximum diameter D3 of the tower 12 and tower section 13 thereof being connected to the new tower support mount 204 may be less than the maximum diameter D1 and greater than the maximum diameter D2. Notably, the new tower support mount 204 may be sized to accommodate a larger new tower section 13, which may advantageously facilitate the implementation of newer, more efficient technology and components, such as a new, more technologically advanced machine head and associated tower and other various components. Accordingly, additional life and more efficient power generation can be provided with reduced capital expenses.

It should be understood that various components or portions thereof may be under ground 15 or above ground 15 in accordance with the present disclosure. Some ground 15 may, for example, be removed to exposed existing components and facilitate modification or addition of new components, as discussed herein. Further, ground 15 may be added to cover various components or portions thereof after installation, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for refurbishing a wind turbine, the method comprising:
   positioning a new tower support mount on an existing foundation of the wind turbine, the existing foundation comprising an existing foundation pad and an existing tower support mount at least partially embedded in the existing foundation pad, the existing tower support mount comprising structure that connected a lower section of a removed old tower to the existing foundation pad;

inserting a plurality of anchors through the new tower support mount; and connecting a tower section of a new tower of the wind turbine to the new tower support mount, wherein a maximum diameter of the new tower support mount is greater than a maximum diameter of the existing tower support mount.

2. The method of claim 1, further comprising providing a new foundation pad on the existing foundation, wherein at least a portion of each of the plurality of anchors is embedded in the new foundation pad.

3. The method of claim 1, wherein the new tower support mount comprises a ring body, an upper flange extending radially from the ring body, and a lower flange extending radially from the ring body.

4. The method of claim 3, wherein the new tower support mount is positioned such that the lower flange is positioned on the existing foundation pad.

5. The method of claim 3, wherein a plurality of anchor holes extend through the lower flange, and each of the plurality of anchors extends through one of the plurality of anchor holes.

6. The method of claim 3, wherein the new tower support mount is positioned such that the upper flange is positioned on the existing tower support mount.

7. The method of claim 3, wherein a plurality of fastener holes extend through the upper flange, and each of a plurality of fasteners extends through one of the plurality of fastener holes and one of a plurality of mating fastener holes defined in the existing tower support mount.

8. The method of claim 3, wherein the new tower support mount further comprises an adaptor body extending from the upper flange and an adaptor flange extending radially from the adaptor body.

9. The method of claim 1, wherein the new tower support mount comprises a disc.

10. The method of claim 1, further comprising removing a portion of the existing tower support mount.

11. A method for refurbishing a wind turbine, the method comprising:

positioning a new tower support mount on an existing foundation of the wind turbine, the existing foundation comprising an existing foundation pad and an existing tower support mount at least partially embedded in the existing foundation pad; and inserting a plurality of anchors through the new tower support mount;

providing a new foundation pad on the existing foundation, wherein at least a portion of each of the plurality of anchors is embedded in the new foundation pad; and connecting a tower section of a tower of the wind turbine to the new tower support mount.

12. The method of claim 11, wherein the new tower support mount comprises a ring body, an upper flange extending radially from the ring body, and a lower flange extending radially from the ring body.

13. The method of claim 11, wherein the new tower support mount comprises a disc.

14. A refurbished wind turbine, the refurbished wind turbine comprising:

an existing foundation, the existing foundation comprising an existing foundation pad and an existing tower support mount at least partially embedded in the existing foundation pad, wherein the existing tower support mount is configured to connect a lower section of a removed old tower having a first diameter to the existing foundation pad;

a new tower support mount positioned on the existing foundation and configured to connect a lower tower section having a second radius greater than the first radius; and a plurality of anchors extending through the new tower support mount.

15. The refurbished wind turbine of claim 14, further comprising a new foundation pad positioned on the existing foundation and at least partially embedding each of the plurality of anchors.

16. The refurbished wind turbine of claim 15, wherein the new tower support mount protrudes from the new foundation pad.

17. The refurbished wind turbine of claim 14, further comprising a tower section connected to the new tower support mount.

18. The refurbished wind turbine of claim 14, wherein the new tower support mount comprises a ring body, an upper flange extending radially from the ring body, and a lower flange extending radially from the ring body.

19. The refurbished wind turbine of claim 17, wherein the new tower support mount further comprises an adaptor body extending from the upper flange and an adaptor flange extending from the adaptor body.

20. The refurbished wind turbine of claim 14, wherein the new tower support mount comprises a disc.

* * * * *